Jan. 16, 1940.  C. T. PEACOCK  2,187,051
DAMMING ATTACHMENT FOR LISTER SEEDERS
Filed Dec. 19, 1938
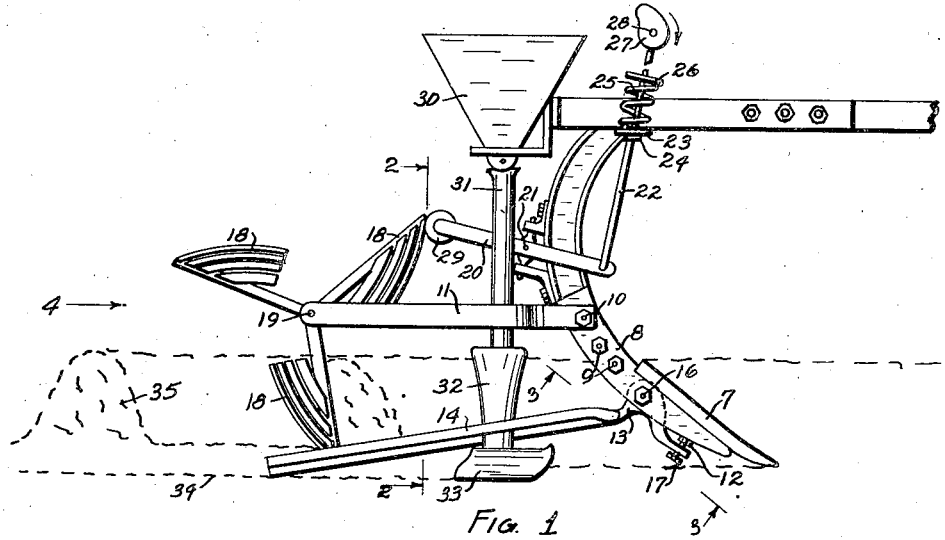
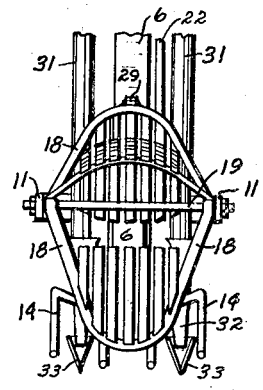
FIG. 4
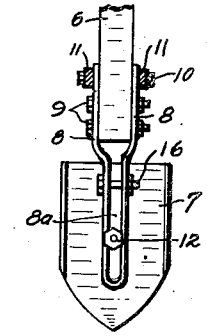
FIG. 3
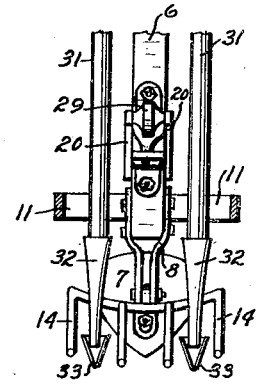
FIG. 2
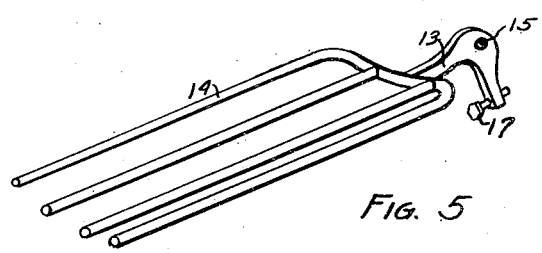
FIG. 5
INVENTOR
Charles T. Peacock
By Martin E. Anderson
ATTORNEY Patented Jan. 16, 1940

2,187,051

UNITED STATES PATENT OFFICE 2,187,051

DAMMING ATTACHMENT FOR LISTER SEEDERS

Charles T. Peacock, Lincoln County, Colo.

Application December 19, 1938, Serial No. 246,560

13 Claims. (Cl. 97—55)

This invention relates to improvements in Damming attachments for lister seeders.

In United States Letters Patents 1,892,002 and 2,003,116 granted to me respectively on December 27, 1932 and December 27, 1937, damming listers have been described and claimed which are of great value to farmers operating in the semi-arid regions of our own and other countries.

In regions where this type of apparatus is primarily employed, the land is cropped every other year and lies fallow every other year. During the fallow year the soil is cultivated to keep down moisture consuming weeds and to keep the soil in the best possible condition to absorb moisture. During the fallow season the land is preferably cultivated by means of chisel shovel listers that cut deep into the soil and which are equipped with damming attachments of the type described and claimed in the above patents. When the lister furrows are dammed at spaced intervals, a large number of basins are formed that prevent water after heavy rains from running downwardly in the lister furrows and thereby prevents erosion and promotes absorption of the water. In winter such basins fill with snow and hold this in place until it thaws in the spring. The advantages of basin farming are widely recognized and great profit is derived therefrom.

Lister seeders are also employed which sow two spaced rows of seed in the bottom of each lister furrow. Until now no one has produced a lister seeder that is provided with a damming attachment and this has generally been considered as involving insuperable difficulties.

It is evident that a damming attachment of the general type now used with listers is unsuited for use with lister seeders because the scrapers will cut into the seed bed and bunch the seeds or else they will cover the seeds so deeply that they will not grow.

It is the object of this invention to produce a damming attachment that can be employed with a lister seeder and which will produce dams at spaced intervals without disturbing the seed.

Another object is to produce a damming attachment that will serve to assure a uniform depth for planting so that the seeds will all germinate and grow uniformly; and A further object is to produce an improved damming attachment for listers that do not have to be supported by springs or other similar means, but which will cut to a uniform depth regardless of the irregularities in the surface of the land.

The above and other objects of this invention are attained by means of a construction and an arrangement of parts that will now be described and for this purpose reference will be had to the accompanying drawing in which one embodiment of the invention has been illustrated, and in which:

Fig. 1 is a side view showing an ordinary damming lister with a seeding attachment in place thereon, and also showing the means for protecting the seed against disturbance by the damming shovels;

Figure 2 is a section taken on line 2—2, Fig. 1;

Figure 3 is a rear view of the lister beam and shovel from which the damming attachment and the seed bed protector have been removed;

Figure 4 is a rear elevation looking in the direction of arrow 4, Fig. 1; and

Figure 5 is a perspective view of the seed bed protector.

In the drawing reference numeral 6 designates the lister beam to the lower end of which a chisel type shovel 7 is attached by means of an elongated U-shaped member having spaced sides 8 that are attached to the lower end of beam 6 by means of bolts 9 and 10. Bars 11 are pivoted at their front ends and extend rearwardly. The lower end of the member whose sides have been indicated by numeral 8 are closer together than sides 8 and a bolt 12 extends through the opening 8a and serves to hold the shovel 7 in place.

A grate comprising a curved gooseneck 13 has a curved transverse integral bar at one end and from this a plurality of rods 14 extend. The gooseneck 13 has an opening 15 for the reception of the bolt 16 that serves as a pivot. The free end of the gooseneck has a bolt 17 that is positioned to engage the head of bolt 12 and this bolt is adjustable in the threaded opening and determines the extent of the downward movement of bars 14 in the manner shown quite clearly in Fig. 1.

Three damming shovels 18 are attached to a shaft or pivot 19 that is supported in openings in the rear or free ends of the bars 11. When the shovels 18 are in the position shown in Fig. 1, the shovel that projects downwardly rests on the bars 14 which therefore determine the limit of its downward movement. For the purpose of holding shovels 18 in operative position while accumulating dirt for a dam, an escapement has been provided which comprises two arms 20 that are mounted for rocking movement about a pivot 21 carried by beam 6. A rod 22 is attached to the front ends of arms 20 and serves to tilt the arms 20 about their pivot. Rod 22 has been shown as passing through an opening in a guide plate 23 that is carried by the beam 6 and is provided with an enlargement 24 that engages the under side of plate 23 and limits the upward movement of the rod. A helical coil spring 25 has been shown as encircling the rod 22 above the plate 23 and is normally held under compression by means of the ring 26 that is attached to the bar. A cam 27, attached to a shaft 28 that is rotated from the wheels supporting the lister, (not shown in the drawing) moves rod 22 downwardly once each revolution and this raises the rear ends of arms 20 sufficiently to remove the roller 29 from engagement with shovel 18. Cam 27 is so designed that it releases rod 22 immediately after the shovels 18 have been released so that the roller 29 can return in time to stop the forward movement of the next shovel. The parts just described function as an escapement that permits the shovels to rotate 120 degrees at each release.

The parts described serve to produce dams in the lister furrow at equidistant points and can be used with any ordinary lister. The bars 14 determine the depth to which the shovels can cut and therefore the shovels 18 and the arms 19 do not have to be suspended by tension members or springs, but can float freely. When used with a lister, the bolt 17 may be dispensed with so as to permit greater pivotal movement of the grate. Since the grate will always float on the soil, the shovels can never dig deeper into the ground than to the upper surface of the grate bars.

It is customary to attach seeder elements to a lister and in the drawing numeral 30 designates a seed hopper from which tubes 31 project downwardly. The usual force feed mechanism is provided between the seed hopper and the tubes 30, but this has not been shown because the parts are merely intended to illustrate a seeding mechanism in a general way. Tubes 32 are telescopically connected with tubes 30 and these terminate in sled runners 33. It will be observed that there are a pair of tubes 31 and 32 for each furrow and that the runners are spaced apart so as to seed two rows of grain in each furrow.

It will be observed that the seed is deposited below the bars 14 and since the shovels 18 can cut no deeper than the top of the grate, they cannot disturb the seeds. The shovels will fill in soil to a depth even with the top of bars 14 at the point where the shovels engage the bars and this covers the seed with a layer of soil of uniform thickness, as shown in Fig. 1 where the seeds have been designated by numeral 34 and the finished dams by numerals 35. The seed may not grow directly through the dams, but it will grow out about the base of the dams so that their presence will not in any way decrease the quantity grown per acre.

It will be evident that the presence of the dams 35 will form basins in the furrows for catching rain and snow and will prevent the water, after heavy rains, from flowing along the furrows and eroding them. When the water can flow along the furrows, the seed is washed out and carried to the low places and it frequently happens that when there is plenty rain, the yield of grain is poor because of the erosion and the consequent removal of the seed.

When a damming lister is used during the fallow season and a damming seeder is also used, the moisture conservation will be a maximum and erosion will be reduced to a minimum.

The apparatus shown on the drawing is illustrative of means only and it is contemplated that variations shall be made as may be necessary for the production of the most desirable design for the machinery.

This invention in its broadest aspect comprises a lister seeder having the usual furrow forming tool supported on a frame in the customary manner, a seeding device positioned to the rear of the furrow forming tool for depositing seed in the furrow, means comprising a damming shovel attached to the lister seeder and projecting into the furrow for gathering dirt to form a dam, means for periodically releasing the dirt, and means for supporting the shovel a predetermined distance above the seed.

In the present embodiment the shovel is supported on one or more bars that project from the furrow forming tool to a point underneath the shovel 18 but it is obvious that equivalent means can be substituted and the arrangement illustrated is therefore merely illustrative of means for limiting the downward movement of the shovel 18 to such an extent that it will not disturb the seeds.

When the seeding attachment is not present, it is possible to reduce the number of bars in the grate to a single bar attached at its front end to the furrow forming tool. This simplifies the construction of damming attachments for listers as it dispenses with the heavy supporting means now used for this purpose.

It is desirable that the damming attachment shall have a slight lateral movement as well as a vertical movement so that it can swing laterally in going around curves. This can be accomplished in various ways, but in the present embodiment the pivot pin passes through an opening that flares toward both ends. This has not been shown as it is now old to provide damming attachments with lateral as well as vertical movement.

Having described the invention what is claimed as new is:

1. An implement comprising a frame, a ground working tool carried thereby adapted to form a furrow when the implement is drawn forwardly, a damming device including a scraper disposed to operate in the furrow made by the ground-working tool, means for connecting the device to the implement frame for vertical movement thereof relative thereto, means for supporting the damming device and for limiting its downward movement relative to the bottom of the ground-working tool, comprising a solid member positioned between the bottom of the furrow and the damming device, and means for attaching it to the frame.

2. An implement comprising a frame, a ground-working tool carried thereby adapted to form a furrow when the implement is drawn forwardly, a damming device including a scraper disposed to operate in the furrow made by the ground-working tool, means for connecting the device to the implement frame for free vertical and limited lateral movement relative thereto, means for limiting its downward movement of the damming device relative to the bottom of the ground-working tool, comprising a solid member attached to the frame and positioned between the bottom of the furrow and the damming device, and means for operating the damming device to form dams at spaced intervals.

3. An implement comprising a frame, a ground-working tool carried thereby adapted to form a furrow when the implement is drawn forwardly, a damming device including a scraper disposed to operate in the furrow made by the ground-working tool, means for connecting said device to the implement frame for vertical and limited lateral movement relative to said frame, means for actuating the damming device to form dams at spaced intervals, means for supporting the damming device and for limiting its downward movement relative to the bottom of the ground-working tool, comprising an elongated solid supporting member positioned between the bottom of the furrow and the damming device, and means for attaching the supporting member to the ground-working tool.

4. In combination, an implement including a plurality of transversely spaced ground-working tools adapted to form parallel furrows as the implement is drawn forwardly, a plurality of damming blades connected to said implement for free vertical movement relative thereto, and means comprising a solid member positioned between each damming device and the bottom of the furrow and attached to the implement, for limiting downward movement of the blades relative to the bottom of the furrow.

5. In combination, an implement including a plurality of transversely spaced ground-working tools adapted to form parallel furrows as the implement is drawn forwardly, a plurality of damming blades connected to said implement for free vertical and limited transverse movement relative thereto, and means comprising spaced bars positioned between each damming device and the bottom of the furrow and attached to the implement, for limiting downward movement of the blades relative to the bottom of the furrow.

6. An implement comprising a frame, a furrow forming tool carried thereby, a damming device including a rotatable scraper assembly disposed to operate in the furrow made by the furrow forming tool, said assembly comprising a plurality of blades extending radially from the axis of rotation, detent means for the blades, means for connecting said damming device to the implement frame for free, vertical, lateral swinging movement relative to the frame, and means comprising an elongated member of solid material attached at its front end to the implement frame and positioned between the bottom of the furrow and the under side of the scraper blade for limiting the downwardly movement of the latter.

7. In combination, an implement including a plurality of transversely spaced ground-working tools adapted to form parallel furrows as the implement is drawn forwardly, seeder means for depositing seed in the furrow directly back of the ground-working tool, means comprising damming blades connected with the implement for free, vertical movement, for damming the furrow at spaced intervals, said blades being positioned to the rear of the seeder means, and means comprising an elongated metal bar connected at its front end with the ground-working tool and projecting underneath the damming blade for supporting the latter above the seed bed.

8. In combination, an implement including a plurality of transversely spaced ground-working tools adapted to form parallel furrows as the implement is drawn forwardly, seeder means for depositing seed in the furrow directly back of the ground-working tool, means comprising damming blades connected with the implement for free vertical movement, for damming the furrow at spaced intervals, said blades being positioned to the rear of the seeder means, means comprising an elongated metal bar connected at its front end with the ground-working tool and projecting underneath the damming blade for supporting the latter above the seed bed, and means for holding the bar in any desired angular position relative to the ground-working tool, whereby the depth of the seed coverage can be determined.

9. In combination, an implement including a plurality of transversely spaced ground-working tools adapted to form parallel furrows as the implement is drawn forwardly, seeder means for depositing seed in the furrow directly back of the ground-working tool, means comprising damming blades connected with the implement for damming the furrow at spaced intervals, said blades being positioned to the rear of the seeder means, means for periodically operating the damming blades to release ground accumulated by them, means comprising a plurality of parallel spaced rods connected at their forward ends with the ground-working tool for supporting the damming blades, the rods extending rearwardly between the ground and the scraper blades, and means for adjusting the angular relation between the ground-working tool and the rods to adjust the depth of said coverage.

10. In a lister seeder, comprising a frame, a ground-working tool carried thereby adapted to form a furrow when the implement is drawn forwardly, means positioned to the rear of the ground-working tool for depositing seed in the furrow, a damming device including an earth collecting blade positioned to the rear of the seeding device for forming transverse dams in the furrow, and a depth limiting device connected with the frame and positioned between the blade and the bottom of the furrow for limiting the depth to which the blade can cut.

11. In a lister seeder, comprising a frame, a ground-working tool carrier thereby adapted to form a furrow when the implement is drawn forwardly, means positioned to the rear of the ground-working tool for depositing seed in the furrow, a damming device including an earth collecting blade positioned to the rear of the seeding device for forming transverse dams in the furrow, a depth limiting device connected with the frame and positioned between the blade and the bottom of the furrow for limiting the depth to which the blade can cut, and means for adjusting the height of the depth limiting device above the seed bed.

12. In a lister seeder, comprising a frame, a ground-working tool carried thereby adapted to form a furrow when the implement is drawn forwardly, means positioned to the rear of the ground-working tool for depositing seed in the furrow, a damming device including an earth collecting blade positioned to the rear of the seeding device for forming transverse dams in the furrow, the earth collecting blade being freely movable in a vertical direction and rotatable about a horizontal axis, an escapement device for controlling the movement of the blade, and a depth limiting device positioned between the blade and the bottom of the furrow, comprising a grid formed from spaced parallel rods attached at their front ends to the ground-working tool and extending rearwardly to a position to the rear of the blade.

13. In a lister seeder, comprising a frame, a ground-working tool carried thereby adapted to form a furrow when the implement is drawn forwardly, means positioned to the rear of the ground-working tool for depositing seed in the furrow, a damming device including an earth collecting blade positioned to the rear of the seeding device for forming transverse dams in the furrow, the earth collecting blade being freely movable in a vertical direction, and a depth limiting device positioned between the blade and the bottom of the furrow, comprising a grid formed from spaced parallel rods attached at their front ends to the ground-working tool and extending rearwardly to a position to the rear of the blade, and means for limiting the downward movement of the grid relative to the ground-working tool.

CHARLES T. PEACOCK.